(12) United States Patent
Hull

(10) Patent No.: US 6,846,158 B2
(45) Date of Patent: Jan. 25, 2005

(54) METHOD AND APPARATUS FOR VARYING THE CRITICAL SPEED OF A SHAFT

(75) Inventor: Peter Richard Hull, Ipswich, MA (US)

(73) Assignee: General Electric Company, Schenectady, NY (US)

(*) Notice: Subject to any disclaimer, the term of this patent is extended or adjusted under 35 U.S.C. 154(b) by 107 days.

(21) Appl. No.: 10/236,853

(22) Filed: Sep. 6, 2002

(65) Prior Publication Data

US 2004/0047731 A1 Mar. 11, 2004

(51) Int. Cl.[7] .............................................. F04D 29/04
(52) U.S. Cl. ........................ 416/1; 416/174; 415/229; 384/99
(58) Field of Search ......................... 384/99; 415/229; 416/1, 174

(56) References Cited

U.S. PATENT DOCUMENTS

| | | | |
|---|---|---|---|
| 4,457,667 A | * | 7/1984 | Seibert et al. ............... 415/229 |
| 4,737,655 A | | 4/1988 | Lundberg |
| 4,867,655 A | | 9/1989 | Barbic et al. |
| 4,983,051 A | * | 1/1991 | Hibner et al. ................. 384/99 |
| 5,110,257 A | | 5/1992 | Hibner et al. |
| 5,347,190 A | * | 9/1994 | Lewis et al. ............... 310/90.5 |
| 5,374,129 A | | 12/1994 | Vohr et al. |
| 5,603,574 A | | 2/1997 | Ide et al. |
| RE36,270 E | | 8/1999 | Duggan |
| 6,554,754 B2 | * | 4/2003 | VanRens ....................... 492/10 |

* cited by examiner

Primary Examiner—Edward K. Look
Assistant Examiner—Richard A. Edgar
(74) Attorney, Agent, or Firm—William Scott Andes; Armstrong Teasdale LLP

(57) ABSTRACT

A system is provided for changing the critical speed of a shaft that includes: a first shaft supported for relative rotational movement with respect to a stationary structure, a forward bearing disposed at the forward end of the shaft, an aft bearing disposed at the aft end of the shaft, at least one active bearing disposed between the forward bearing and the aft bearing, and means for changing the support stiffness of the active bearing.

17 Claims, 4 Drawing Sheets

METHOD AND APPARATUS FOR VARYING THE CRITICAL SPEED OF A SHAFT

BACKGROUND OF THE INVENTION

This invention relates generally to rotating shafts and more particularly to methods of controlling the critical speed of a rotating shaft.

In most types of machinery, for example gas turbine engines, it is not allowable to operate a rotating shaft at its critical speed, particularly at its first bending mode, because of the potentially high levels of vibration that may result. This requirement often places substantial constraints and compromises on the machine's design.

Prior art turbofan engines use a shaft diameter that for the shaft's length is sufficient to place the shaft bending critical speed above the shaft's maximum operating speed. Other methods of controlling the shaft's critical speed include using multiple shaft bearings such that the shaft's effective vibration length is reduced and the boundary conditions are sufficiently stiff to also place the critical speed above the operating range. The ability to use these design solutions is compromised when the shaft in question runs concentrically through another shaft, since the inner shaft's length and diameter are constrained by the outer shaft and the surrounding "core engine" structure as, for example, is the case with the low pressure shaft or power shaft of a gas turbine engine.

In some cases, such as turboshaft engines, which often have a limited operating speed range (typically 85% to 100% of maximum RPM), it is acceptable to transiently pass through the critical speed to prevent vibrations from reaching destructive levels. The inner shaft of other devices, such as a turbofan engine, operates over a wide speed range (typically 25% to 100% of maximum RPM), and accordingly there is not a practical "transient" window in which to place the shaft's critical speed, thus requiring the shaft's critical speed to be placed above the maximum operating RPM. Since the "core engine" structure limits the minimum shaft length and maximum shaft diameter, it may not be possible to achieve a feasible turbofan design, or the inner shaft requirements may impose significant operating life and weight penalties on the "core engine".

It is known to use active bearings to change the end support conditions of a shaft in a gas turbine engine. This changes the critical speed of the shaft and allows the critical speed to be moved away from, or "jumped over" an approaching operating speed. However, prior art active bearing design does not change the effective length of the shaft, which limits the amount of change that may be obtained in the shaft's critical speed.

Accordingly, there is a need for an improved method of changing the critical speed of a shaft.

BRIEF SUMMARY OF THE INVENTION

The above-mentioned need is met by the present invention, which provides a system for changing the critical speed of a shaft that includes: a first shaft supported for relative rotational movement with respect to a stationary structure, a forward bearing disposed at the forward end of the shaft, an aft bearing disposed at the aft end of the shaft, at least one active bearing disposed between the forward bearing and the aft bearing, and means for changing the support stiffness of the active bearing.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
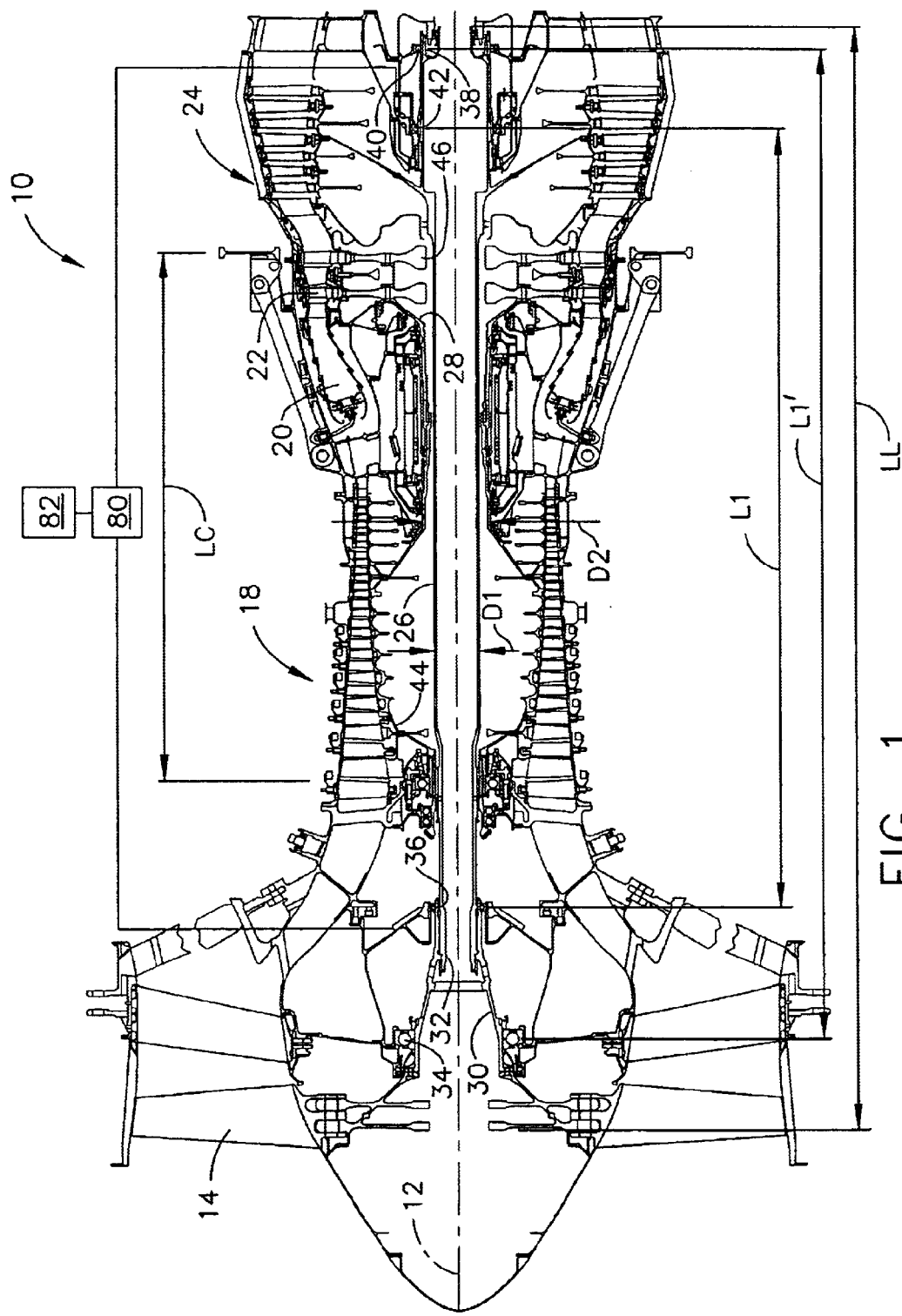
FIG. 1 is a schematic cross-sectional view of a gas turbine engine constructed according to the present invention.

Referring to the drawings wherein identical reference numerals denote the same elements throughout the various views, FIG. 1 shows an exemplary turbofan engine 10 incorporating the critical speed modification system of the present invention. The engine 10 has several components in serial flow relationship along a longitudinal axis 12, including a fan 14, a compressor 18, a combustor 20, a high pressure turbine 22, and a low pressure turbine 24. The low pressure turbine 24 drives a low pressure turbine (LPT) shaft 26 which is splined to a fan shaft 30 that drives the fan 14. The high pressure turbine 22 drives the compressor 18 through a core shaft 28 that is mounted coaxially with and surrounds the LPT shaft 26.

The LPT shaft 26 has a length LL and a diameter D1, and is mounted in a plurality of bearings, which are typically a combination of rotating element (e.g. ball or roller) bearings. In the illustrated example, the forward end 32 of the LPT shaft 26 is supported by a forward bearing 34 and a first active bearing 36 that is axially spaced away from the forward bearing 34, while the aft end 38 of the LPT shaft 26 is supported by an aft bearing 40 and a second active bearing 42 that is axially spaced away from the aft bearing 40. Each of the bearings has an outer race which is attached to a static structure of the engine 10 and an inner race which supports the LPT shaft 26. Although the example described herein is of a system having two active bearings 36 and 42, it is noted that the present invention is equally applicable to a system having only one active bearing, or more than two active bearings. The core shaft 28 has a length LC measured between its forward end 44 and its aft end 46 which is less than the length LL of the LPT shaft 26, and a diameter D2 which is greater than the diameter D1 of the LPT shaft 26. The core shaft 28 is rotatably mounted in a plurality of bearings.

Figure 2:
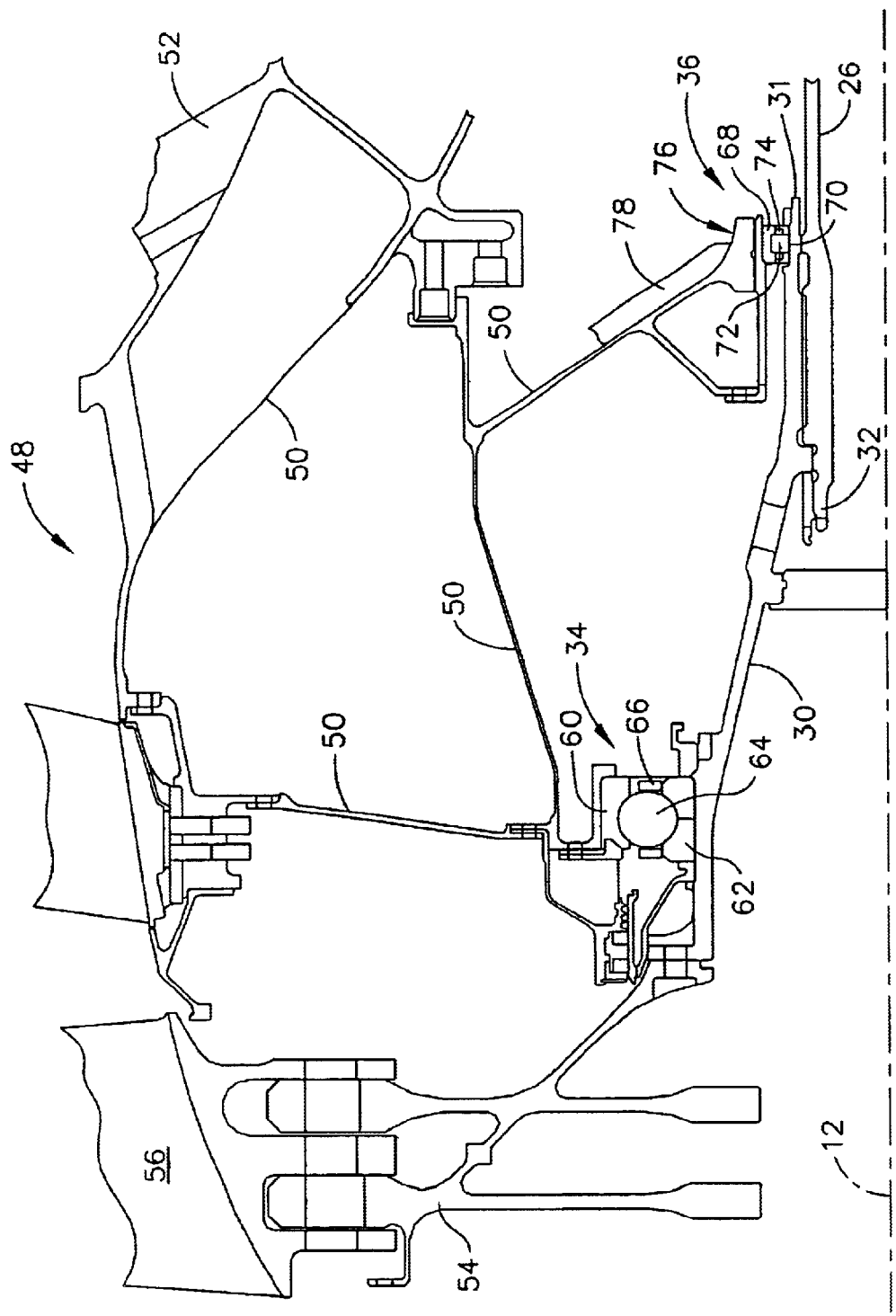
FIG. 2 is an enlarged view of a forward portion of the gas turbine engine of FIG. 1.

FIG. 2 shows a portion of the forward section of the engine 10 in more detail. A forward support structure 48 comprises several generally annular components 50 that are attached to a fan frame 52, which is a major load carrying structure of the engine 10. A fan disk 54 carrying a plurality of fan blades 56 is attached to a fan shaft 30, which is in turn attached to the LPT shaft 26, for example by a known type of spline joint. The fan shaft 30 and the LPT shaft 26 could also be incorporated into a single integral component. The fan shaft 30 and forward end 32 of the LPT shaft 26 are supported by the forward bearing 34 and a first active bearing 36. For the purposes of the present invention, the effective length L (discussed below) of the LPT shaft 26 is considered to include that portion of the fan shaft 30 between the forward bearing 34 and the first active bearing 36. The forward bearing 34 is mounted between the forward support structure 48 and the fan shaft 30. In the illustrated example the forward bearing 34 is a ball bearing. The forward bearing 34 comprises an outer race 60 which is mounted to the forward support structure 48 and an inner race 62 which is mounted to the fan shaft 30. A plurality of balls 64 are disposed between the outer race 60 and the inner race 62 and may be restrained and separated by a cage 66 as shown. The forward bearing 34 has a fixed support stiffness, that is, its stiffness is determined by the flexibility and the physical arrangement of the bearing hardware and the forward support structure 48. This stiffness is not intentionally varied during engine operation.

The first active bearing 36 is mounted between the forward support structure 48 and the fan shaft 30 and is axially spaced away from the forward bearing 34. Typically, the first active bearing 36 is mounted between the forward bearing 34 and the forward end 44 of the core shaft 28. In the illustrated example the first active bearing 36 is a roller bearing. The first active bearing 36 comprises an outer race 68 which is mounted to the forward support structure 48 and an inner race 70 which is mounted to the aft end 31 of the fan shaft 30. A plurality of rollers 72 are disposed between the outer race 68 and the inner race 70 and may be restrained and separated by a cage 74 as shown. The first active bearing 36 has a variable support stiffness, that is, its stiffness is determined not only by the flexibility and the physical arrangement of the bearing hardware and the forward support structure 48, but also by a first variable stiffness support means 76 which can be used to intentionally vary the stiffness during engine operation. In the illustrated example, the first variable stiffness support means 76 include a fluid film damper which is supplied with a varying oil flow through a first conduit 78 by a fluid supply means 80 in response to a signal from a control unit 82 (see FIG. 1), although other means may be used, as described in more detail below.

Figure 3:
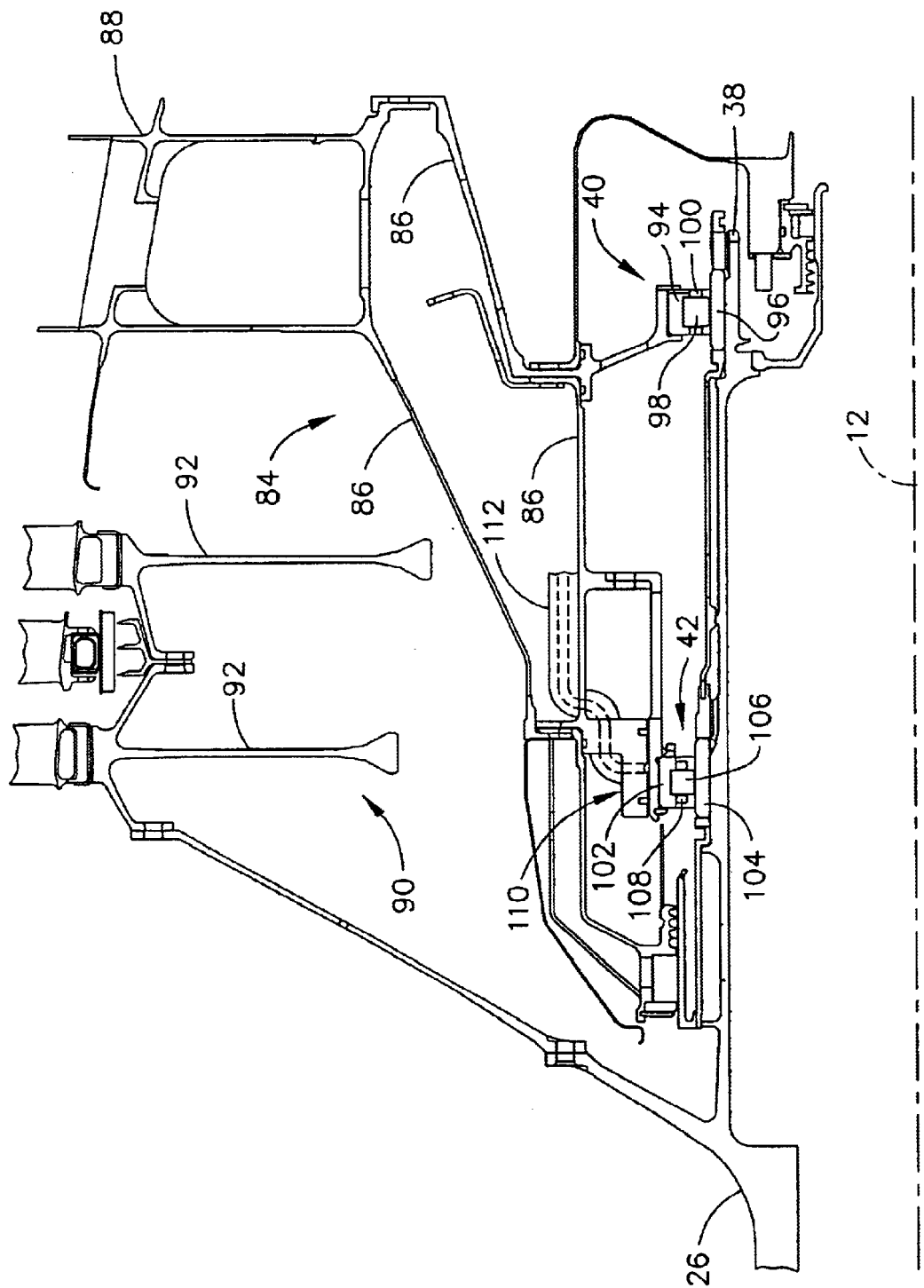
FIG. 3 is an enlarged view of an aft portion of the gas turbine engine of FIG. 1.

FIG. 3 shows a portion of the aft section of the engine in more detail. An aft support structure 84 comprises several generally annular components 86 which are attached to a turbine rear frame 88, which is a major load carrying structure of the engine 10. A low pressure turbine rotor 90 carrying a plurality of low pressure turbine disks 92 is attached to the LPT shaft 26. The aft end of the LPT shaft 26 is supported by an aft bearing 40 and a second active bearing 42. The aft bearing 40 is mounted between the aft support structure 84 and the LPT shaft 26, closest to the aft end 38 of the LPT shaft 26. In the illustrated example the aft bearing 40 is a roller bearing. The aft bearing 40 comprises an outer race 94 which is mounted to the aft support structure 84 and an inner race 96 which is mounted to the LPT shaft 26. A plurality of rollers 98 are disposed between the outer race 94 and the inner race 96 and may be restrained and separated by a cage 100 as shown. The aft bearing 40 is has a fixed support stiffness, that is, its stiffness is determined by the flexibility and the physical arrangement of the bearing hardware and the aft support structure 84. This stiffness is not intentionally varied during engine operation.

The second active bearing 42 is mounted between the aft support structure 84 and the LPT shaft 26 and is axially spaced away from the aft bearing 40. Typically, the second active bearing 42 is mounted between the aft bearing 40 and the aft end 46 of the core shaft 28. In the illustrated example the second active bearing 42 is a roller bearing. The second active bearing 42 comprises an outer race 102 which is mounted to the aft support structure 84 and an inner race 104 which is mounted to the aft end 38 of the LPT shaft 26. A plurality of rollers 106 are disposed between the outer race 102 and the inner race 104 and may be restrained and separated by a cage 108 as shown. The second active bearing 42 has a variable support stiffness, that is, its stiffness is determined not only by the flexibility and the physical arrangement of the bearing hardware and the aft support structure 84, but also by a second variable stiffness support means 110 which can be used to intentionally vary the stiffness during engine operation. In the illustrated example, the second variable stiffness support means 110 include a fluid film damper which is supplied with a varying oil flow through a second conduit 112 by a fluid supply means 80 in response to a control unit 82 (see FIG. 1), although other means may be used, as described in more detail below.

Any known means capable of selectively changing the stiffness between a bearing and surrounding structure could be used to provide the variable support stiffness for the active bearings described above. One example of a suitable means would be a magnetic bearing, wherein one or more magnetic bearing elements of a known type would be selectively activated or deactivated to apply and remove a magnetic force acting on the first active bearing, thus varying its stiffness. Another known type of magnetic bearing selectively applies a magnetic field to a rheological fluid enclosed in a flexible enclosure, causing the fluid's stiffness to change.

Another suitable means for providing variable support stiffness would be a fluid film damper. For example, in one known type of bearing mount the bearing outer race is supported by a flexible metallic "squirrel cage" incorporating a plurality of longitudinal spring elements which act in parallel with a viscous fluid film damper that can be controllably filled and emptied with a damping fluid such as oil.

Yet another suitable means for providing variable support stiffness would be to mechanically control the bearing stiffness, for example by using a controllable mechanical means to modify the influence of a spring element on the bearing.

Control of the system of the present invention could be incorporated into an existing control unit 82, for example a known full authority digital engine control (FADEC) could be used to control the operation of a fluid supply means 80 (see FIG. 1). The fluid supply means 80 could comprise a pump supplying pressure to the variable stiffness support means 76 and 110, or a constant pressurized fluid flow could be supplied to control valves (not shown) mounted in close proximity to the active bearings 36 and 42, which would then pass the fluid flow to the variable stiffness support means 76 and 110. The control unit 82 would control the operation of the fluid supply means 80 in a pre-programmed manner in response to varying LPT shaft speed N1, as described in more detail below.

The operation of the present invention will now be described in further detail. The fundamental equation for calculating the first bending critical speed $F_n$ of a shaft is:

$$Fn = \frac{C}{L^2}\sqrt{\frac{gEI}{w}} \quad (1)$$

Where C is a function of the shaft's end boundary conditions, L is the shaft's length, g is gravitational acceleration, E is the modulus of elasticity of the shaft material, I is the cross-sectional moment of inertia of the shaft, and w is the weight per unit length of the shaft. As can be seen from examination of equation (1), if the support stiffness of one or both of the active bearings 36 and 42 is reduced to a low value (for example near zero), not only will the end boundary conditions C change, but the shaft's effective length L would also be varied because of the absence of the influence of the active bearings, thus causing a change in the shaft's critical speed. By way of example, for the illustrated LPT shaft 26, and assuming that both active bearings 36 and 42 are in the activated or deactivated condition concurrently, the value of C may be reduced by a factor of about 2.3:1, when both bearings are deactivated (i.e. their stiffness reduced), while the baseline effective length L1 may be increased by about 27% as depicted by modified effective length L1' in FIG. 1. This allows a change of the critical speed to a modified value $Fn_1$ which is about 28% of the baseline critical speed $Fn_0$.

Figure 5:
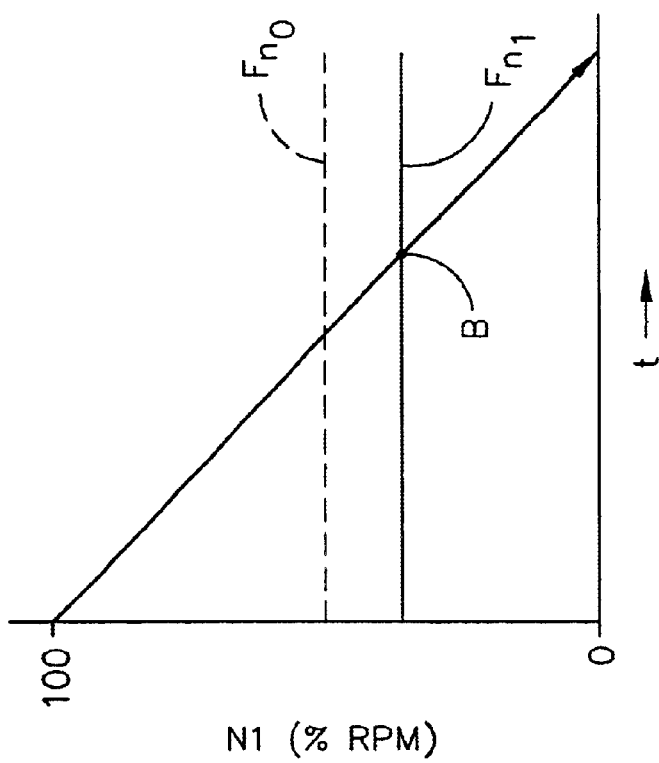
FIG. 5 is a schematic chart depicting the operation of the system of the present invention during engine deceleration.
Figure 4:
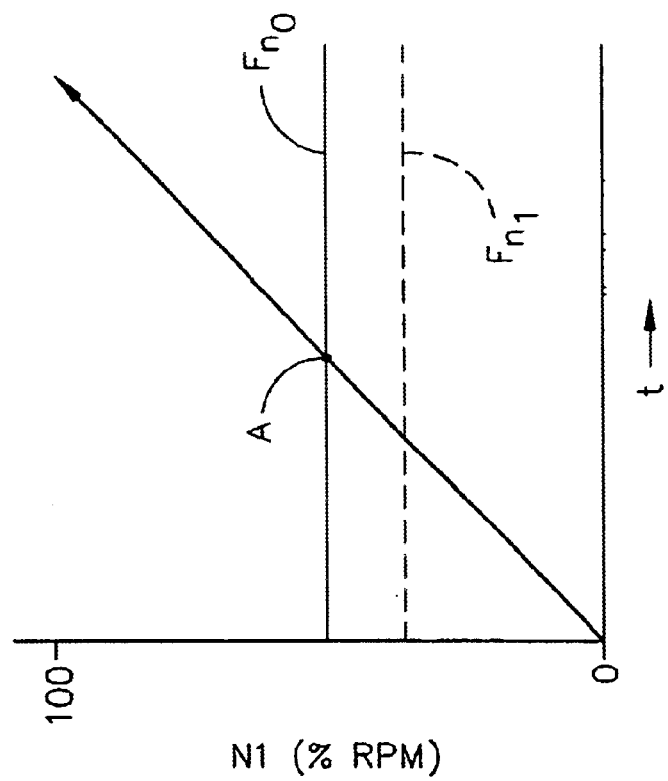
FIG. 4 is a schematic chart depicting the operation of the system of the present invention during engine acceleration.

An example of the system's operation is illustrated in FIGS. 4 and 5. In FIG. 4, the speed N1 of the LPT shaft 26 is plotted as a function of time t. FIG. 4 shows an accelerating condition as shown by the increase of N1 with increasing time. A critical speed $Fn_0$ of the LPT shaft 26, for example the first bending critical speed, is shown as a horizontal line. Under baseline conditions, for example with one or both of the active bearings 36 or 42 activated (i.e., the stiffness applied), the shaft speed N1 would coincide with the critical speed $Fn_0$ at the point labeled A. At this operating condition, the LPT shaft 26 would experience increased vibration, deflection, and stresses which could result in severe damage or destruction thereof. However, as discussed above, it may be necessary or desirable to operate the LPT shaft 26 at this speed for an extended period of time. Accordingly, in the present invention, when the shaft speed N1 approaches the baseline critical speed $Fn_0$, the support stiffness of one or both of the variable stiffness support means 76 and 110 is modified, for example by reducing their stiffness to a low value, possibly near zero. This reduces the critical speed to a modified value, denoted by the line $Fn_1$. The amount of change in the critical speed, denoted Δ, is controlled by the amount of change in the shaft end conditions C and the effective shaft length L. In this condition, the actual shaft speed no longer coincides with the critical speed.

FIG. 5 is generally similar to FIG. 4, except that FIG. 5 shows a decelerating condition as shown by the decrease of N1 with increasing time. The modified critical speed $Fn_1$ of the LPT shaft 26 is shown as a solid horizontal line. If the modified critical speed $Fn_1$ were left unchanged, the shaft speed N1 would coincide with the modified critical speed $Fn_1$ at the point labeled B. Under this condition, the LPT shaft 26 would experience increasing vibration, deflection, and stresses which could result in severe damage or destruction thereof. Accordingly, when the shaft speed N1 approaches the modified first bending critical speed $Fn_1$, the support stiffness of one or both of the variable stiffness support means 76 and 110 is changed back to its unmodified (stiffer) value. This increases the critical speed to its baseline value $Fn_0$, denoted by a horizontal dashed line. Again, the actual shaft speed does not coincide with the critical speed.

The foregoing has described a system for changing the critical speed of a shaft that includes: a first shaft supported for relative rotational movement with respect to a stationary structure, a forward bearing disposed at the forward end of the shaft, an aft bearing disposed at the aft end of the shaft, at least one active bearing disposed between the forward bearing and the aft bearing, and means for changing the support stiffness of the active bearing. While specific embodiments of the present invention have been described, it will be apparent to those skilled in the art that various modifications thereto can be made without departing from the spirit and scope of the invention as defined in the appended claims.

What is claimed is:

1. A method for changing the critical speed of a shaft, comprising:

providing a shaft having forward and aft ends supported for relative rotational movement with respect to a stationary structure;

providing a second shaft having forward and aft ends mounted coaxially with said first shaft, said second shaft having a second diameter greater than said first diameter and a second length shorter than said first length;

providing a forward bearing disposed at said forward end of said shaft, providing an aft bearing disposed at said aft end of said shaft;

providing a first active bearing disposed between said forward bearing and said aft bearing of said second shaft; and changing the support stiffness of said first active bearing.

2. The system for changing the critical speed of shaft of claim 1 wherein said means for changing the support stiffness of said first active bearing comprise a first fluid film damper disposed between said first active bearing and said stationary structure and means for selectively supplying fluid to said first fluid film damper.

3. The method for changing the critical speed of a shaft of claim 1 further comprising:

providing a second active bearing disposed between said first active bearing and said aft bearing; and providing means for changing the support stiffness of said second active bearing.

4. The system for changing the critical speed of shaft of claim 3 wherein said means for changing the support stiffness of said second active bearing comprise a second fluid film damper disposed between said second active bearing and said stationary structure and means for selectively supplying fluid to said second fluid film damper.

5. A system for changing the critical speed of a shaft, comprising:

a first shaft supported for relative rotational movement with respect to a stationary structure, said shaft having forward and aft ends, a first diameter, and a first length;

a forward bearing disposed at said forward end of said shaft, an aft bearing disposed at said aft end of said shaft;

a first active bearing disposed between said forward bearing and said aft bearing;

a second shaft having forward and aft ends mounted coaxially with said first shaft, said second shaft having a second diameter greater than said first diameter and a second length shorter than said first length, wherein said first active bearing is disposed between said forward bearing and said forward end of said second shaft; and means for changing the support stiffness of said first active bearing.

6. The system for changing the critical speed of a shaft of claim 5 wherein said means for changing the support stiffness of said first active bearing comprise a first fluid film damper disposed between said first active bearing and said stationary structure and means for selectively supplying fluid to said first fluid film damper.

7. The system for changing the critical speed of a shaft of claim 5 further comprising:

a second active bearing disposed between said aft end of said second shaft and said aft bearing; and means for changing the support stiffness of said second active bearing.

8. The system for changing the critical speed of shaft of claim 7 wherein said means for changing the support stiffness of said second active bearing comprise a second fluid film damper disposed between said second active bearing and said stationary structure and means for selectively supplying fluid to said second fluid film damper.

9. The system for changing the critical speed of a shaft of claim 5 wherein said means for changing the support stiffness of said first active bearing comprise a first fluid film damper disposed between said first active bearing and said stationary structure and means for selectively supplying fluid to said first fluid film damper.

10. The system for changing the critical speed of shaft of claim 5 further comprising:

a second active bearing disposed between said first active bearing and said aft bearing; and means for changing the support stiffness of said second active bearing.

11. The system for changing the critical speed of a shaft of claim 10 wherein said means for changing the support stiffness of said second active bearing comprise a second fluid film damper disposed between said second active bearing and said stationary structure and means for selectively supplying fluid to said second fluid film damper.

12. A system for changing the critical speed of a gas turbine engine shaft, comprising:

a turbine shaft supported for relative rotational movement with respect to a stationary structure, said turbine shaft having forward and aft ends, a first diameter, and a first length;

a core shaft having forward and aft ends mounted coaxially with said turbine shaft, said core shaft having a second diameter greater than said first diameter and a second length shorter than said first length;

a forward bearing disposed at said forward end of said turbine shaft, an aft bearing disposed at said aft end of said turbine shaft;

a first active bearing disposed between said forward bearing and said aft bearing of said core shaft; and means for changing the support stiffness of said first active bearing.

13. The system for changing the critical speed of a gas turbine engine shaft of claim 12 wherein said means for changing the support stiffness of said first active bearing comprise a first fluid film damper disposed between said first active bearing and said stationary structure and means for selectively supplying fluid to said first fluid film damper.

14. The system for changing the critical speed of a gas turbine engine shaft of claim 12 further comprising:

a second active bearing disposed between said first active bearing and said aft bearing; and means for changing the support stiffness of said second active bearing.

15. The system for changing the critical speed of a gas turbine engine shaft of claim 14 wherein said means for changing the support stiffness of said second active bearing comprise a second fluid film damper disposed between said second active bearing and said stationary structure and means for selectively supplying fluid to said second fluid film damper.

16. The system for changing the critical speed of a gas turbine engine shaft of claim 14 further comprising:

a second active bearing disposed between said aft end of said core shaft and said aft bearing; and means for changing the support stiffness of said second active bearing.

17. The system for changing the critical speed of a gas turbine engine shaft of claim 16 wherein said means for changing the support stiffness of said second active bearing comprise a second fluid film damper disposed between said second active bearing and said stationary structure and means for selectively supplying fluid to said second fluid film damper.

* * * * *